Oct. 31, 1939.  G. STEUERLEIN  2,178,291
GUN MOUNT FOR AIRCRAFT
Filed Oct. 20, 1936  3 Sheets-Sheet 2
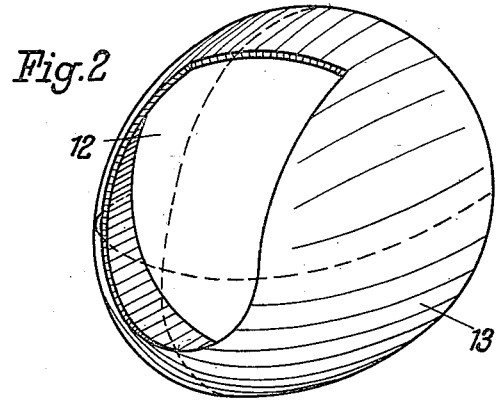
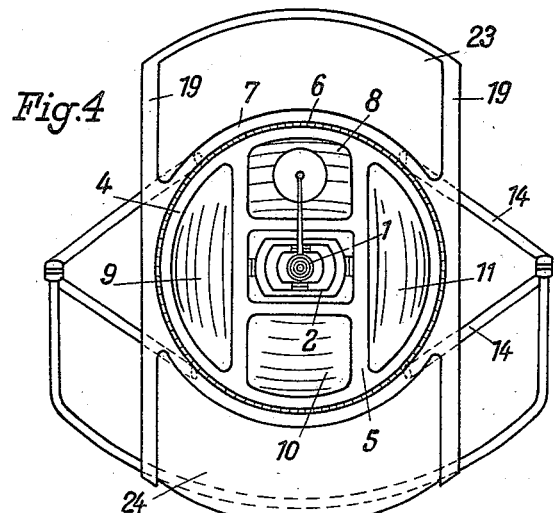
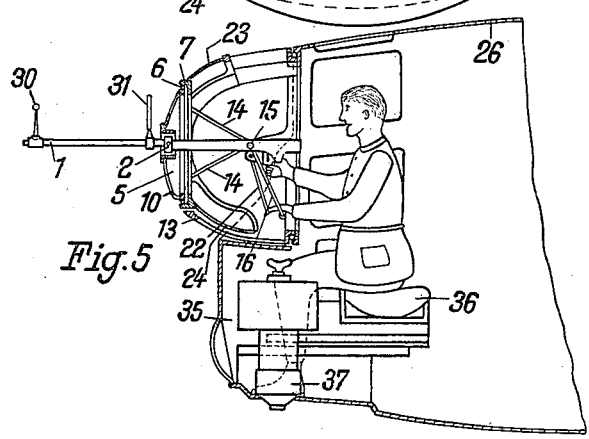

Oct. 31, 1939.     G. STEUERLEIN     2,178,291
GUN MOUNT FOR AIRCRAFT
Filed Oct. 20, 1936     3 Sheets—Sheet 3

Inventor
Gustav Steuerlein
by Karl Kirchauer
Atty.

Patented Oct. 31, 1939

2,178,291

UNITED STATES PATENT OFFICE 2,178,291

GUN MOUNT FOR AIRCRAFT

Gustav Steuerlein, Dessau, Germany, assignor to Junkers Flugzeug-und-Motorenwerke Aktiengesellschaft, Dessau, Germany Application October 20, 1936, Serial No. 106,563
In Germany June 10, 1936

8 Claims. (Cl. 89—37.5)

My invention relates to gun mounts, quite especially adapted for use in aircraft. It is an object of my invention to provide means for mounting a machine or other gun in such a manner as to provide the greatest possible field of fire, while at the same time affording the greatest possible protection for the gunner.

When mounting guns in aircraft it is important to so mount the gun that the largest possible angle can be swept with the gun and that the parts of the craft, in which the gun is mounted, have an aerodynamically favorable form so as not to unduly increase the air resistance. It is further important that the gunner be protected as far as possible from the relative wind. In order to attain all this, it has been customary to arrange at the points, where the guns are mounted, transparent projecting vault-like structures and to pivotally connect the gun with a frame guided in a slot of the vault in such manner that the rear end of the gun extends into the cupola, while the barrel projects through the slot. With gun mounts of this kind the gunner cannot be protected against the relative wind entering through the slot of the cupola to the extent of not being hindered in the operation of the gun.

I avoid these drawbacks by mounting the gun, in the middle of a window mounted in a circular frame, the gun projecting through the window and being so arranged therein, preferably by means of a Cardan joint and the window frame being so guided in a rim that the window can be turned, together with the gun, about the rim axis. The rim, which carries the window of circular configuration, traversed by the gun, is mounted for displacement in a meridian slot of an otherwise closed cupola, which is mounted for rotation about its axis on a second rim fixed for instance to an airplane fuselage. I prefer fixing to the first rim other windows which are so shaped that when the first rim is displaced in the slot of the cupola, the uncovered open part of the slot is covered by them at least in proximity of the window.

By shifting the rim carrying the window in the slot of the cupola and by turning the cupola relative to the structure, on which it is mounted, the line of fire can be roughly adjusted throughout the space in front of the cupola, while the fine adjustment, i. e. the training proper is rendered possible by the all around pivotal arrangement of the gun in the window.

In a gun mount as above described the gunner is protected against the relative wind in all positions of the gun by the window supporting the gun and by the additional covering windows.

My invention further includes means for readily adjusting the window supporting the gun in the slot of the cupola, for turning this latter and for locking these parts relative to the structure, on which they are mounted.

In the drawings affixed to this specification and forming part thereof, a gun mount embodying my invention is illustrated diagrammatically by way of example.

In the drawings,

Fig. 1 is a vertical axial section,

Fig. 2 a perspective view and

Fig. 3 a horizontal section on the line III—III in Fig. 1.

Fig. 4 is a front elevation of the parts arranged for displacement in the cupola.

Fig. 5 is a vertical section, drawn to a smaller scale, illustrating the accommodation for the gunner to the rear of the cupola.

Figure 1:
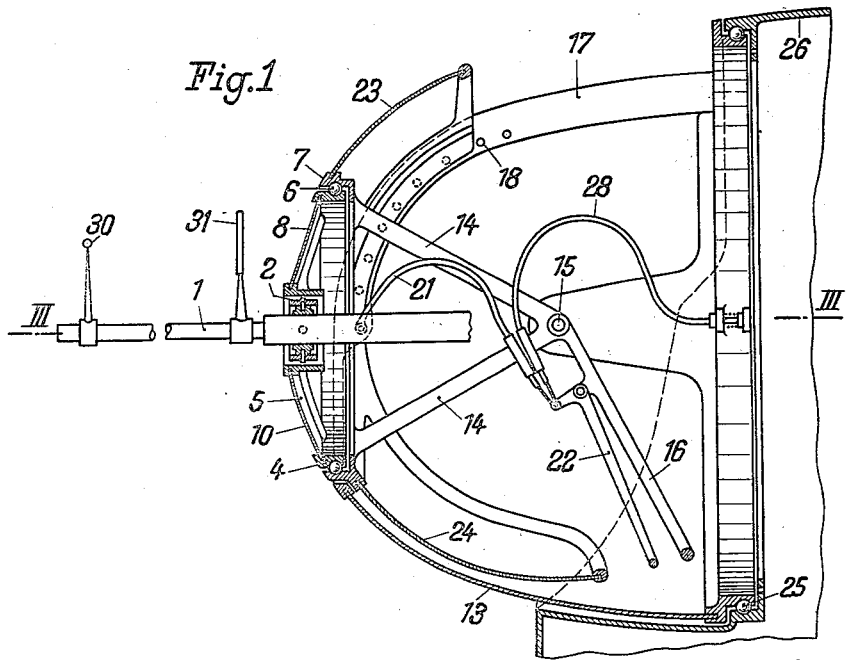
Figure 3:
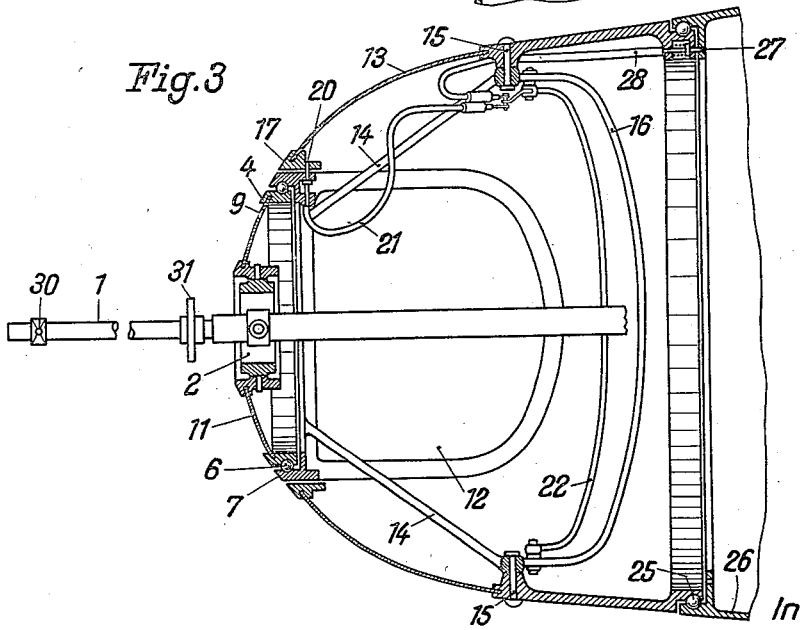

Referring to the drawings 1 is the gun and 2 is the Cardan joint, by means of which it is suspended in the vaulted window 5 supported in a circular frame 4 in such manner as to project through the window. The circular window frame 4 is supported, by means of an antifriction bearing 6, in a vertical rim 7 in such manner, that by rocking the gun about its longitudinal axis, the window frame 4 can easily be turned, together with the gun, about its centre point which is also the centre point of the rim. In the section 8 of the window 5, through which passes the sighting line, a plane transparent pane is mounted, in order to avoid distortions of the view. The transparent panes in the other sections 9, 10, 11 of the window may be curved or vaulted so as to present an aerodynamically favorable form. The rim 7 supporting the window 5 is mounted for displacement in a meridian slot 12 of an otherwise closed cupola 13, which extends on one side of the cupola from the apex towards the edge of the cupola. This latter is rotatably mounted by means of an antifriction bearing 25 on the fuselage 26 of an aircraft, for instance at the nose of the craft. On the rim 7 arms 14 are mounted, which are pivotally connected at 15 to the cupola. The pivotal connections 15 are fixed in the cupola and their axis extends through the centre point of the hemispherical front part of the cupola and at right angles to the middle plane of the slot. The rim 7 is guided in the slot 12 by means of guide ledges 19 fixed thereon, which slide on the frame 17 surrounding the slot. To the arms 14 mounted on the rim 7 is fixed a bow-shaped handle 16. If this handle 16 is rocked about the pivots 15 of the rim 7, this latter is displaced in the slot 12 of the cupola. If the handle is rocked about the axis of the cupola, this latter is rotated relative to its support and the slot 12 of the cupola can thus be turned through any desired angle about the cupola axis. In order to enable the rim 7 to be locked in different positions relative to the slot 12, a locking device is provided, consisting of a bolt 20 displaceably mounted on the turning frame 7 and adapted to enter holes or notches 18 provided in the guide frame 17 surrounding the slot. Normally the bolt is retained in one of these holes or notches by spring action; if it is desired to adjust the turning frame, the bolt can be withdrawn from the notch by means of a Bowden train 21 leading to an auxiliary handle 22, which is so positioned relative to the handle 16, that both handles can be gripped with one hand and that by forcing the handles towards each other, the frame is unlocked. The unlocking of the cupola is effected by another bolt 27 operatively connected to the auxiliary handle 22 and displaced by means of another Bowden train 28, this bolt normally locking the cupola 13 to the part 26 of the craft supporting it.

On the rim 7 are further mounted covering windows 23 and 24 extending on both sides of the rim in the direction of the middle meridian of the slot. These windows cover also the parts of the slot adjoining the middle window 5 and serve to improve the protection afforded against the relative wind. In the modification shown in the drawing, if the gun extends in the direction of the cupola axis, the top window 23 still leaves part of the slot uncovered. If desired, this window may be made long enough to cover also this part of the slot. When displacing the rim 7 carrying the windows in the slot of the cupola, the covering window then partly enters the space in the craft to the rear of the cupola.

Figure 6:
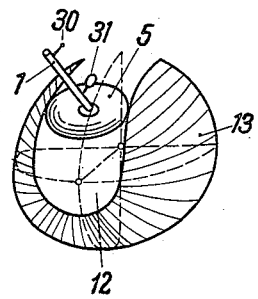
Figs. 6 to 9 are perspective views of the cupola showing different positions of the latter and of the gun.

When operating these parts, the gunner, as shown in Fig. 5, grips the butt of the gun with one of the two handles 16, 22 with the other hand. For forward and upward firing the cupola is so adjusted that the slot opens upwardly (Fig. 6) and the gun can now be adjusted within this quadrant as desired.

Figure 7:
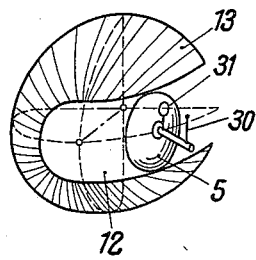

For firing within a quadrant extending between the cupola axis and the left hand side of the gunner, the cupola is so turned, that the slot extends to the left (Fig. 7). If in that case the butt of the gun is held in its normal position, the gun together with the window is turned relative to the turning frame 7, so that the sighting arrangement 30, 31 always remains in front of the eye of the gunner. The gun can now be turned to all sides within this quadrant.

Figure 8:
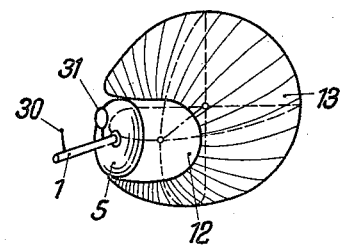
Figure 9:
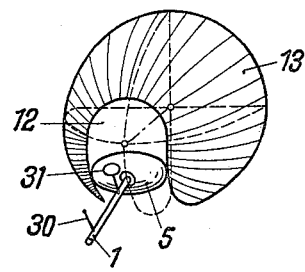

In a similar manner the gunner can fire in the quadrant to the right, after having turned the cupola in such manner that the slot extends to the right (Fig. 8). He can also turn the cupola so far that the slot points downward (Fig. 9) and he can then fire in the lower quadrant of the vertical middle plane.

Obviously the slot in the cupola may be made to assume any desired intermediate positions so that the new arrangement enables the gunner to fire in all directions.

Preferably the cupola 13 is arranged on the part 26 of the craft, for instance at the bow or the stern of the fuselage or on a separate fuselage in such manner that it is in alignment with the top edge of this body, which latter extends downwardly beyond the cupola. In the direction of travel, the cupola extends beyond this bottom part of the body 35, so that, if the cupola and the gun are adjusted correspondingly, the gunner may fire downwardly. The bottom part of the structure supporting the cupola is preferably utilized to accommodate the gunner's seat 36 and observation instruments 37, bomb throwing devices and their supports etc.

I wish it to be understood that I do not desire to be limited to the exact details of construction shown and described for obvious modifications will occur to a person skilled in the art.

I claim:

1. An aircraft gun mount comprising, in combination with an aircraft body having a wall with an opening therein, a slotted shell adapted to cover said opening, means positioning said shell over the opening for rotation about an axis intersecting the plane of said opening, supporting means rigid with said shell positioned inside the same, a frame member of substantially the contour of said shell and having an opening therein, means extending from the frame and pivotally connected with said supporting means for swinging the frame along the longitudinal axis of said slot, a panel rotatably positioned within the opening in said frame, said panel including a transparent portion, a gun extending through said panel and having sight means aligned with the transparent portion of the panel, and gun supporting means carried by the panel constructed and arranged to support the gun for universal pivotal movement about a point adjacent the transparent portion of said panel while precluding rotation of the gun about its longitudinal axis.

2. A gun mount structure as defined in claim 1 wherein the shell is of spherical contour.

3. A gun mount as defined in claim 1 wherein the gun supporting means is a Cardan joint.

4. A gun mount as defined in claim 1 wherein the frame is adapted to close the slot in the shell.

5. A gun mount as defined in claim 1 wherein the shell is of spherical contour and the slot therein extends through substantially a quadrant thereof.

6. An aircraft gun mount comprising, in combination with an aircraft body having a wall with an opening therein, a slotted shell adapted to cover said opening, means positioning said shell over the opening for rotation about an axis intersecting the plane of said opening, supporting means rigid with said shell positioned inside the same, a frame member of substantially the contour of said shell and having an opening therein, means extending from the frame and pivotally connected with said supporting means for swinging the frame along the longitudinal axis of said slot, a panel rotatably positioned within the opening in said frame, said panel including a transparent portion, a gun extending through said panel and having sight means aligned with the transparent portion of the panel, gun supporting means carried by the panel constructed and arranged to support the gun for universal pivotal movement about a point adjacent the transparent portion of said panel while precluding rotation of the gun about its longitudinal axis, and actuating means rigidly associated with said frame swinging means whereby rotary movement of said shell and swinging movement of said frame may be accomplished independently or simultaneously.

7. An aircraft gun mount comprising in combination with an aircraft body having a wall with an opening therein, a slotted shell adapted to cover said opening, means positioning said shell over the opening for rotation about an axis intersecting the plane of said opening, supporting means rigid with said shell positioned inside the same, a frame member of substantially the contour of said shell and having an opening therein, means extending from the frame and pivotally connected with said supporting means for swinging the frame along the longitudinal axis of said slot, a panel rotatably positioned within the opening in said frame, said panel including a transparent portion, a gun extending through said panel and having sight means aligned with the transparent portion of the panel, gun supporting means carried by the panel constructed and arranged to support the gun for universal pivotal movement about a point adjacent the transparent portion of said panel while precluding rotation of the gun about its longitudinal axis, and means for locking the shell member and the frame member at selected points of their movement.

8. An aircraft gun mount comprising, in combination with an aircraft body having a wall with an opening therein, a slotted shell adapted to cover said opening, means positioning said shell over the opening for rotation about an axis intersecting the plane of said opening, supporting means rigid with said shell positioned inside the same, a frame member of substantially the contour of said shell and having an opening therein, means extending from the frame and pivotally connected with said supporting means for swinging the frame along the longitudinal axis of said slot, a panel rotatably positioned within the opening in said frame, said panel including a transparent portion, a gun extending through said panel and having sight means aligned with the transparent portion of the panel, gun supporting means carried by the panel constructed and arranged to support the gun for universal pivotal movement about a point adjacent the transparent portion of said panel while precluding rotation of the gun about its longitudinal axis, means for locking the shell member and the frame member at selected points of their movement, and actuating means for said locking means rigidly associated with said frame swinging means whereby rotary movement of said shell, swinging movement of said frame, and locking of said frame and shell may be accomplished simultaneously or independently by manipulation of said actuating means.

GUSTAV STEUERLEIN.